United States Patent

(12) United States Patent
Mahapatra

(10) Patent No.: US 9,338,592 B1
(45) Date of Patent: May 10, 2016

(54) REDUCING CROWDSOURCING NETWORK TRAFFIC

(71) Applicant: Amazon Technologies, Inc., Seattle, WA (US)

(72) Inventor: Abinash Mahapatra, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/559,795

(22) Filed: Dec. 3, 2014

(51) Int. Cl.
*H04W 24/00* (2009.01)
*H04W 4/02* (2009.01)
*H04W 64/00* (2009.01)
*H04W 88/08* (2009.01)
*H04W 84/04* (2009.01)

(52) U.S. Cl.
CPC ............... *H04W 4/02* (2013.01); *H04W 4/025* (2013.01); *H04W 64/00* (2013.01); *H04W 88/08* (2013.01); *H04W 84/045* (2013.01)

(58) Field of Classification Search
CPC ..... H04W 64/00; H04W 4/02; H04W 64/003; H04W 4/04; H04W 4/023; H04W 48/16; H04W 4/025; H04W 84/12; H04W 88/08; H04W 4/021; H04W 4/028; H04W 84/045
USPC ................................ 455/456.1–457; 370/338
See application file for complete search history.

(56) References Cited

U.S. PATENT DOCUMENTS

| 8,805,403 | B2 | 8/2014 | Curticapean et al. | |
| 2011/0143776 | A1* | 6/2011 | Shankaranarayanan | G06Q 10/06 455/456.3 |
| 2014/0036768 | A1 | 2/2014 | Gao et al. | |
| 2014/0179237 | A1* | 6/2014 | Gao | H04W 4/025 455/67.11 |
| 2015/0133152 | A1* | 5/2015 | Edge | H04W 24/10 455/456.1 |
| 2015/0334678 | A1* | 11/2015 | MacGougan | H04W 64/003 701/451 |

FOREIGN PATENT DOCUMENTS

WO     WO2009124348 A1   10/2009

* cited by examiner

*Primary Examiner* — Olumide T Ajibade Akonai
(74) *Attorney, Agent, or Firm* — Lee & Hayes, PLLC

(57) ABSTRACT

A system for reducing crowdsourcing network traffic has a server that aggregates data from a plurality of devices within a particular area. The devices determine their locations using, for example, a location engine (e.g., Global Positioning System (GPS)) to learn its geographic coordinates. As part of the crowdsourcing exercise, the device opportunistically scans for nearby communication nodes, such as Wi-Fi access points and the like. When a communication node is found, the electronic device associates the device's location coordinates with the detected communication nodes to create data that is tagged with the identity of the communication nodes. The tagged data may be stored locally on the electronic device and periodically uploaded to the server. When the server has sufficient information on the communication nodes in the area, the server sends a notification to the devices to refrain from additionally scanning for and/or sending additional tagged data, thereby curbing the amount of network traffic.

19 Claims, 8 Drawing Sheets

REDUCING CROWDSOURCING NETWORK TRAFFIC

BACKGROUND

Various electronic devices, such as smart phones, tablet computing devices, wearable computing devices (e.g., watches, glasses), portable media players, portable gaming devices, electronic readers, and the like, may include the capability to determine a location of the electronic device as well as the capability to detect and communicate via a wireless network (e.g., wide area network or a local area network). Data related to the location of the various devices as well as wireless networks near these devices may often be collected for various purposes. Crowdsourcing is a process used to collect data from a large group of these electronic devices. As the number of users of electronic devices has increased, data obtained from crowdsourcing is often robust as there are plenty of devices from which to collect. However, after a certain amount of data is collected, additional data collection becomes unnecessary.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components of features.

DETAILED DESCRIPTION

Figure 1:
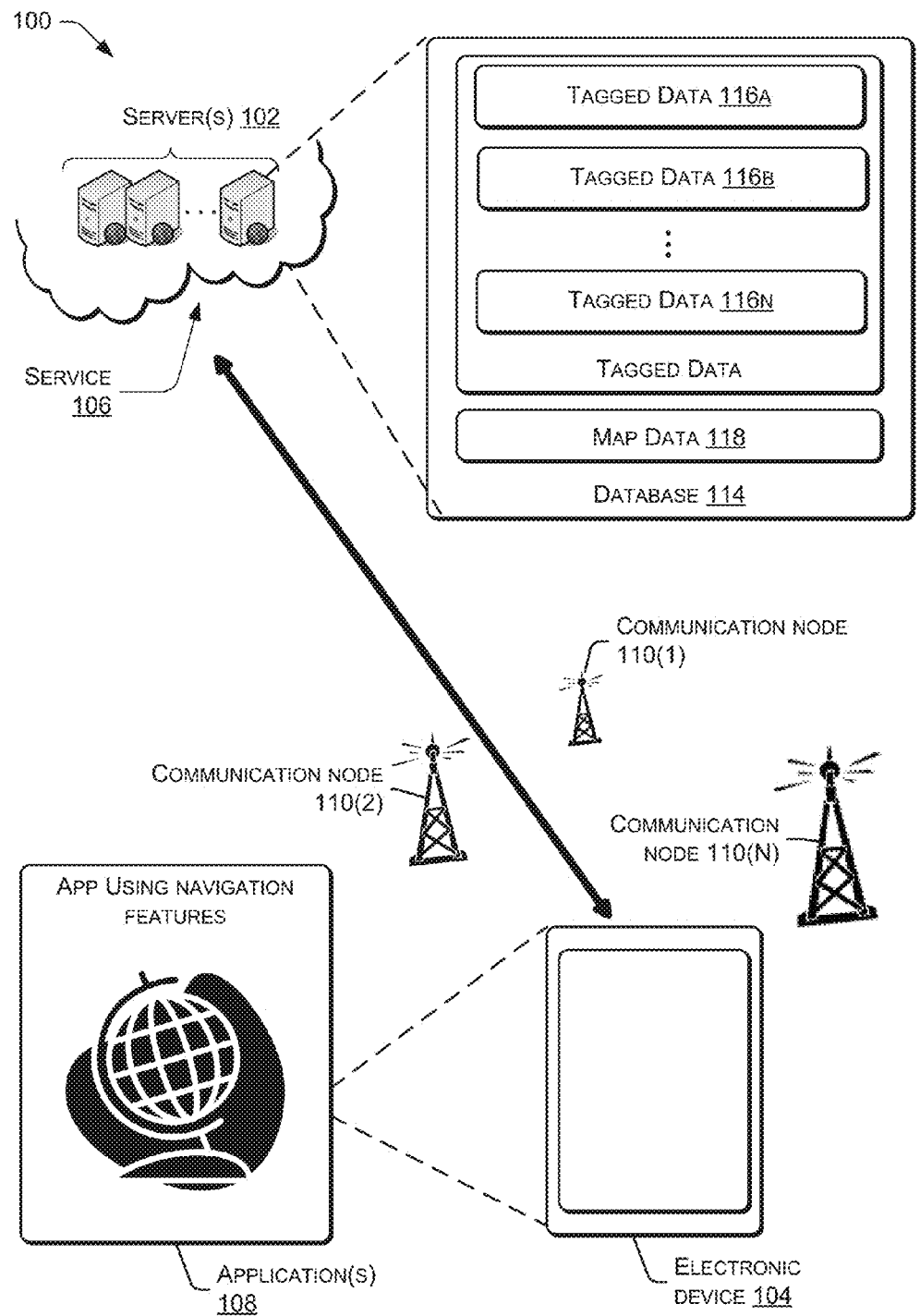
FIG. 1 illustrates a system for crowdsourcing relevant data from an electronic device.

Described herein are techniques for reducing network traffic involved in crowdsourcing, which has the added benefit of saving power on electronic devices. Generally, the crowdsourcing techniques reduce network traffic and power usage of an electronic device by implementing a handshake between the device and a server prior to the device sending crowdsourcing data to the server.

According to aspects described herein, the electronic device determines its location within a particular area, such as by using a Global Positioning System (GPS) to learn its geographic coordinates. The device may seek its location as part of running an application, such as a mapping application. Additionally, the device scans for nearby communication nodes for various purposes, such as when the device needs to connect to a Wi-Fi access point or if the device needs to create data for crowdsourcing purposes. For crowdsourcing purposes, the device may opportunistically scan for nearby communication nodes, such as Wi-Fi access points and the like when it detects that a GPS session is occurring. When a communication node is found, the electronic device associates the device's location coordinates with the detected communication nodes to create data that is tagged with the identity of the communication nodes. The tagged data may be stored locally on the electronic device.

The device may subsequently upload the tagged data to a location database server. The device may send it periodically at timed intervals, or after a certain amount of data is collected, or upon any other event. The tagged data is stored at the location database server. As part of the crowdsourcing endeavors, the server essentially aggregates this tagged data from many devices throughout a common region to help learn things about the region, such as the various network access points available within the region as well the location of these various network access points.

In one implementation, prior to sending the tagged data to the location database server, the electronic device may query the server to verify that the server needs the tagged data. That is, the server may not need to receive the additional data pertaining to the communication nodes because it may already have a sufficient full view of the network structure within the region and the location of nodes within the network structure. Accordingly, the server may ask the devices to refrain from sending the tagged data.

In another additional implementation, the electronic device may request a map from the server and store it locally on the electronic device. The map contains an identity of various areas throughout a particular region that is covered by the map. The electronic device may reference the map when deciding whether to opportunistically scan for communication nodes. If areas detected by the device appear on the map, there is no need to initiate a scan for new nodes, or any need to send tagged data to the server as it is likely redundant.

By performing an initial handshake with the server prior to transferring the tagged data, the electronic device may reduce network traffic by only sending the tagged data that the server indicates is needed. Additionally, by limiting the scenarios within which the electronic device performs an opportunistic scan, the electronic device may save power by refraining from scans that it would otherwise perform. Accordingly, the electronic device may avoid performing unnecessary scans or unnecessarily clogging the network by sending redundant or unneeded data.

FIG. 1 illustrates a system 100 that may be used to crowd source relevant data from electronic devices in local vicinity. The system includes one or more servers 102 and any number of electronic devices, as represented by an electronic device 104. The servers 102 can include a number of components, such as one or more processors, memory, one or more displays, and one or more interfaces, such as communication interfaces, and the like. The servers 102 can also include one or more input/output devices, such as a keyboard, microphone, and so forth. The servers 102 can also include capabilities for communicating with other servers, and devices such as the electronic device 104, via a wireless or wired network.

The servers 102 may be part of a service 106, which collects and manages data from the electronic devices, such as device 104. The service provider may be implemented as remote services, such as cloud services, which generally refer to a network-accessible platform implemented as a computing infrastructure of processors, storage, software, data access, and so forth that is maintained and accessible via a network, such as the Internet. The service 106 may not require end-user knowledge of the physical location and configuration of the system that delivers the services. Common expressions associated with such remote or cloud services include "on-demand computing," "software as a service (SaaS)," "platform computing," "network accessible platform," and so forth.

The electronic device 104 can include a number of components, such as one or more processors, memory, one or more displays, and one or more interfaces, such as communication interfaces, peripheral device interfaces, and the like. In some implementations of the electronic device 104, such as in the implementations of a mobile phone, the device can include one or more antennas, analog-to-digital and digital-to-analog conversion chips, one or more signals processors, and radio frequency (RF) amplifiers. The electronic device 104 can also include one or more input/output devices, such as a keyboard, touchscreen, microphone, speakers, and so forth. In several implementations, the electronic device 104 may be a mobile device, such as a mobile phone, a tablet, a reader device, a laptop computer, a navigation system, a media playing device, a portable gaming device, a netbook computing device, a wearable computing device (e.g., watch, glasses), and so on.

The electronic device 104 may also include capabilities for detecting a location of the device and exchanging data over a wireless or wired network. The electronic device 104 may be configured to detect its own location by using any known navigation system. For instance, the detected location may be in terms of a latitude and longitude position on the surface of the earth. In an illustrative implementation, the electronic device 104 uses a Global Position System (GPS) resident on the device to determine location. Additionally, the electronic device 104 can have network interface controllers or a wireless network interface controller that allows the device to exchange data over a wired or wireless network. In the case of wireless networks, the electronic device 104 can utilize such wireless networks as a wide area network (e.g., cellular network) or a local area network (e.g., a Wi-Fi network), or the like.

The electronic device 104 can store and execute one or more user applications 108 that utilize the device's navigation capabilities. For example, application 108 can include a maps application, a social networking application, a gaming application, a marketplace application, or any other application that might utilize the location of the device for various services provided by the application. In particular, application 108 may utilize the navigation capability of the electronic device 104 to ascertain a location of the device and tailor services provided to a user based on the location of device. In an illustrative implementation, application 108 may be a maps application that navigates roads and streets for a user.

At various times, the electronic device 104 may scan for the presence of communication nodes 110(1), 110(2), . . . , 110(N) that are within range of the device. Communication nodes 110(1)-(N) may include any point within a network or a communication network including a connection point, a redistribution point or a communication endpoint. For example, within a local area network (LAN) or wide area router, a communication node may be a cell tower, base station, mobile phone, or the like including any other access point which may have a corresponding media access control (MAC) address and/or a service set identifier (SSID) and/or any other type of identifier of the communication node.

In an illustrative implementation, the electronic device 104 may determine the location of the device in response to an application 108 requesting the location of the device. For example, suppose a map application running on the device 104 wants to determine the location of the user in order to offer directions to a particular destination. While the electronic device 104 determines its location it may also obtain information about the presence of one or more communication nodes 110(1)-(N) that are within range of the device. One or more communication nodes 110(1)-(N) may be within a communicating range, communication range or detectable range of the device when the device may connect reliably to the communication node. The range within which a communication node may be detected by the device is not a fixed figure and depends on a number of factors such as a height of antenna over surrounding terrain, the frequency of the signal in use, a transmitter's rated power, local geography, and directional characteristics of the node's antenna array, among other factors. For example, based on these factors, the range may vary from 150 to 300 feet to a few miles. In many embodiments, a communication node may be within a communicating range, communication range or detectable range of the device when the device is able to detect the communication node identifier of the communication node. In various implementations, a communication node 110(1)-(N) may periodically broadcast information corresponding to the communication node such as the communication node identifier of the communication node. The electronic device 104 may obtain this information by performing an opportunistic scan and detecting the presence of one or more of the communication nodes 110(1)-(N) while it also determines the location of the electronic device 104.

Alternatively, the electronic device 104 may have performed a scan and detected the presence of one or more communication nodes 110(1)-(N) prior to determining the location of the electronic device 104. If this scan was performed within a certain threshold amount of time to when the location of the electronic device 104 was determined, the electronic device 104 may use the data from the prior scan. For example, suppose that one minute prior to opening the map application, the device 104 ran a web browsing application that needed access to a wireless network. The device 104 may have run a scan to determine the presence of one or more of the communication nodes 110(1)-(N) so that the browsing application may access the internet. When the device 104 launches the map application and determines its location a minute later, instead of performing an additional scan to determine the presence of one or more of the communication nodes 110(1)-(N), the device 104 may use the data from the scan performed a minute ago.

The device stores information corresponding to the communication nodes along with the location of the device. This information may be used to create tagged data, which may include a device identifier, communication node identifier, longitude, latitude, time, accuracy metric, and the like. At predetermined intervals of time, the electronic device 104 may send the tagged data to the servers 102.

The servers 102 may incorporate or have access to one or more databases, as represented by database 114. Database 114 is used to store the tagged data received from the electronic device 104, as shown by the tagged data 116a, 116b, . . . , 116n. The servers 102 may receive tagged data from any number of electronic devices 104 and hence store tagged data 116a-n from several different electronic devices.

According to aspects of the techniques described herein, prior to sending the tagged data to the servers 102, the electronic device 104 may communicate with the servers 102 to determine whether the tagged data is needed. Alternatively, the electronic device 104 may receive a notification from the server 102 indicating whether the tagged data is needed without initiating prior contact with the servers 102. As the servers 102 accumulate tagged data received from the electronic device 104, as well as several other electronic devices, the servers 102 may determine that additional tagged data is no longer needed. When the servers 102 makes the determination that additional tagged data is no longer needed, the servers 102 may send a notification to the electronic device 104 to suppress the tagged data and halt the electronic device 104 from sending any more of the tagged data. In this manner, the crowdsourcing traffic to the servers 102 may be reduced.

In additional embodiments, the servers 102 may further maintain map data 118, as shown stored in the database 114. The map data 118 may include information identifying a location on the surface of the earth, as measured by latitude, longitude and radius. The map data 118 may contain data points corresponding to a city, a country, a specific region of the world or any geographical region defined by a latitude, a longitude and a radius. The electronic device 104 can download the map data 118 from the servers 102 to determine which, if any, tagged data should be uploaded to the servers 102. For instance, if the map data contains reference to a certain threshold of communication nodes or other points of interest in the region of the electronic device 104, then the device 104 may understand that it need not send any additional tagged data to the servers 102. The device 104 may download various different map data at different times depending on several factors such as a change in location of the device 104, an expiration of the map data and so forth. For example, at one time the device 104 may download map data for the state of Texas, then determine that it has moved to New York and subsequently download map data for the state of New York. In various embodiments, each map data may identify multiple geographical regions. In this manner, the traffic caused by crowdsourcing data from the many devices 104 may be significantly reduced. Moreover, by keeping the devices 104 from uploading unnecessary data to the servers 102, the devices 104 may conserve power, resulting in longer usage.

Figure 2:
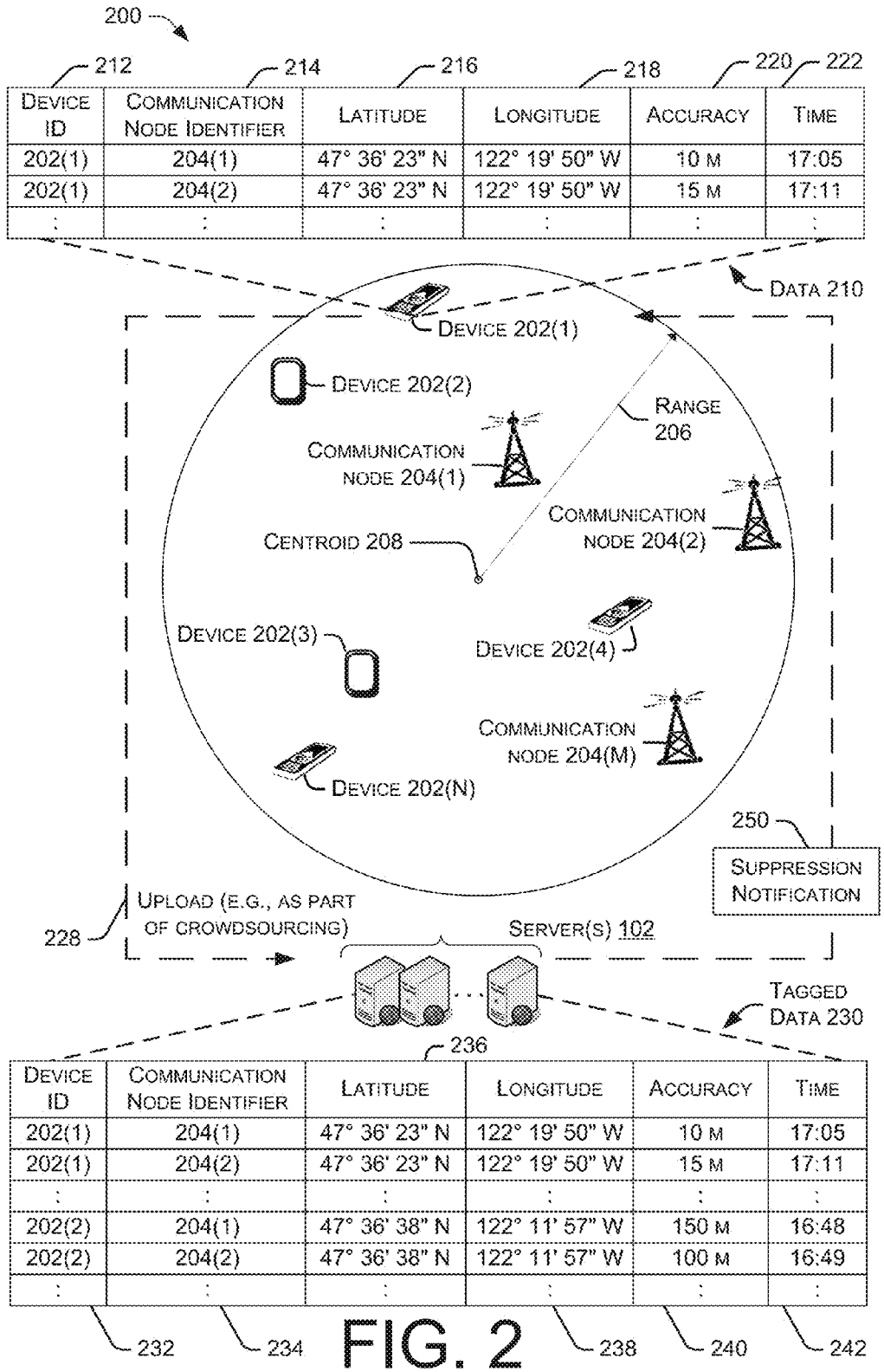
FIG. 2 illustrates an environment in which devices may upload information related to a communication node.

FIG. 2 illustrates an environment in which various devices 202(1), 202(2), 202(3), 202(4), ..., 202(N) may temporarily store information related to their location and to detected communication nodes 204(1), 204(2), ..., 202(M), and subsequently upload that data to the servers 102 as part of a crowdsourcing session. FIG. 2 depicts various devices 202(1)-(N) and communication nodes 204(1)-(M) within a certain area, as represented by a given range 206 around a centroid 208. In this example, the centroid 208 may represent any position on the surface of the earth, as measured by the intersection of a latitude and longitude on the earth. As illustrated in FIG. 2, devices 202(1)-(N) can be essentially any electronic device, as described above with respect to device 104 (e.g., a mobile phone, a tablet, a reader device, a laptop computer, etc.). Additionally, communication nodes 204(1)-(M) can include any access point within a network as described above with respect to nodes 110(1)-(N) (e.g., a router, a cell tower, base station, mobile phone, or the like).

At any given time, one of the devices, such as device 202(1), may determine its own location. For instance, a user might launch an application that queries the electronic device 202(1) for its location. In response to the query, the device 202(1) may utilize a location engine within the device 202(1) to determine its location. In several embodiments, the location engine may utilize a navigation system that provides location information anywhere on or near the surface of the earth. As one example, the device 202(1) utilizes a GPS component that returns a specific location address (e.g., longitude and latitude) of the device.

As part of the process, prior to, or separately therefrom, the device 202(1) may also initiate a scan to detect the presence of any nearby communication nodes 204(1)-(M). In this illustrative implementation, the device 202(1) may detect the presence of the communication nodes 204(1)-(M) within the range 206. The device 202(1) stores data 210 in its memory, where the data corresponds to the device's location within the range 206 around centroid 208 as well as the detected presence and identities of local communication nodes 204(1)-(M). While shown in conjunction with device 202(1) for discussion purposes, data 210 is representative of various pieces of data that each device 202(1)-(N) may store within respective local device memory with respect to detected communication nodes 204(1)-(M). The data 210 may be stored in a structured form, with each instance or record having any number of data fields such as a device identifier 212, a communication node identifier 214, a latitude value 216, a longitude value 218, an accuracy value 220, and a time stamp 222. These are merely representative fields, and more or less data fields may be included in the data 210.

The device identifier field 212 is an identifier that is unique to the associated device 202(1)-(N). In data 210, device 202(1) has its identifier listed in the field, as represented by the reference number 202(1).

The communication node identifier field 214 contains identifiers that are unique to the communication nodes 204(1)-(M) that are found by the device 202(1)-(N). For instance, continuing the illustrative implementation with regards to device 202(1), suppose the device 202(1) scans for nearby communication nodes within the range 206 and identifies communication node 204(1). The device 202(1) stores as part of the data 210 a communication node identifier 214 for the detected communication node 204(1), as represented by the reference number 204(1) for the node. In many implementations, the communication node identifier can include any unique device identifier of the communication node. For example, the communication node identifier 214 may be a unique device identifier that may be assigned to the communication node by a manufacturer of the communication node. In other implementations, the communication node identifier 214 is a permanent identifier of the communication node 204(1) within a physical network segment, where the communication node identifier 204(1) does not change, for example, when the communication node 204(1) is connected to a different network.

In various implementations, the device 202(1) can scan for nearby communication nodes 204(1)-(M) by detecting signals broadcast from the nearby communication nodes. As mentioned previously, periodically, the communication nodes 204(1)-(M) broadcast relevant information such as its communication node identifier. The device 202(1) can detect this periodically broadcast information as well as the strength of the signal when it performs a scan for nearby communication nodes and store the information in the device memory.

Additionally, each device, such as device 202(1), may store the device's current location in the form of a latitude 216 and longitude 218. Latitude 216 and longitude 218 correspond to positions within a geographic coordinate system of the earth. In other embodiments, the device's current location can be recorded using any coordinate system that uniquely identifies locations on the surface of a sphere, such as a spherical coordinate system. Device 202(1) can also store information related to its elevation relative to the sea level (not shown).

Device 202(1) may also store an accuracy value 220 as part of the data 210. In several implementations, accuracy value 220 corresponds to a confidence level of the detected position of the device 202(1). In one embodiment, the accuracy of the detected position of the device 202(1) may indicate that the position of the device 202(1) is accurate within a circle of confidence. In an illustrative implementation, the accuracy may indicate that the device 202(1) is within a few meters of the detected location of the device (e.g., on the highway) or within several hundred meters of the detected location (e.g., in a densely populated downtown area).

Additionally, in the illustrative implementation, a time at which each recorded instance of the communication node identifier 214, latitude 216, longitude 218, and accuracy 220 were captured on the device 202(1) is stored in field 222 as part of the data. In other implementations, the time 222 may correspond to when all of the data was acquired or when one or a few of these data were acquired.

Similar to the data 210 stored on device 202(1) in FIG. 2, each of the other devices 202(2)-(N) may likewise detect the local communication nodes 204(1)-(M) within the range 206 and store associated data within each device's local memory. For example, device 202(2) may detect the presence of one or more communication nodes 204(1)-(M) and store within its local memory the associated communication node identifiers, latitude and longitude of the device 202(2) during detection, an accuracy, and a time corresponding to when this data was acquired. Similarly, device 202(3) may detect the presence of one or more communication nodes 204(1)-(M) and store within its local memory the associated communication node identifiers, and so on. Accordingly, each device identifier is associated with the communication node identifier in the data 210.

In the illustrated implementation of FIG. 2, the data 210 of the various electronic devices 202(1)-(N) can be uploaded as tagged data at various times based on various methods described herein to one or more servers, such as the servers 102. For instance, the data may be uploaded as part of a crowdsourcing session or exercise. This is illustrated graphically in FIG. 2 as dashed flow line 228 from device 202(1) to servers 102. Since this data includes information about detected nodes, such as Wi-Fi access points, the uploaded data is termed "tagged data" herein to help explain that the location data is tied to the data about the communication nodes. The data 210 from device 202(1) may be uploaded at a different time from the data of other devices, such as device 202(2). Each device 202(1)-(N) may upload its data based on a predetermined time interval that may be unique to each device. Additionally, each device 202(1)-(N) may upload its respective data to the same server, a different server, or multiple servers.

As shown in FIG. 2, the periodically uploaded data from each device 202(1)-(N) is stored as tagged data 230 at the servers 102. The tagged data 230 aggregated from the multiple devices 202(1)-(N) may be stored in a structured form, with each instance or record having any number of data fields, such as a device identifier 232, a communication node identifier 234, a latitude value 236, a longitude value 238, an accuracy value 240, and a time stamp 242. These are merely representative fields, and more or less data fields may be included in the tagged data 230.

As depicted in FIG. 2, the tagged data 230 aggregates the data recorded at the various devices 202(1)-(N). Here, for example, tagged data received from the device 202(1) includes multiple node identifiers 204(1), 204(2), etc. In each case, the location of the device 202(1) is recorded as part of the latitude and longitude fields 236 and 238. In this example, the device did not move between detection of the communication nodes. Similarly, the device 202(2) also detects the communication nodes 204(1), 204(2), etc. But, the device 202(2) is in a different location than device 202(1), as represented by the latitude 236 and longitude 238 for device 202(2) (i.e., 47° 36' 38" N by 122° 11' 57" W) being different than that for device 202(1) (i.e., 47° 36' 23" N by 122° 19' 50" W). However, in some implementations, these data points may be similar since the devices 202(1) and 202(2) are located within a range 206 of centroid 208. In cases where the location engine may provide a location of a device with a granularity that is less than range 206, the latitudes and longitudes. Additionally, the times provided in time field 242 are likely to be different for each record in the tagged data 230, as the devices 202(1)-(N) may acquire the data at different times.

Although FIG. 2 shows a set of servers 102, the data 210 from the devices 202(1)-(N) may be uploaded to other sets of one or more servers where each server set may be serviced by different and unrelated entities. In this implementation, each entity may manage their own database of tagged data. Data 210 is not necessarily uploaded to one or more servers at the same time, nor is this information necessarily uploaded to the same server.

According to the traffic reduction techniques described herein, the devices 202(1)-(N) may receive a suppression notification 250 that directs the recipient device, such as device 202(1) in FIG. 2, to stop sending data 210 to the servers 102. The servers 102 may determine that a threshold amount of data for a communication node has accumulated on the servers 102 and determine that additional data similar to data 210 may be suppressed. This determination to suppress data may be specific to a communication node or specific to a geographical region. Additionally, the determination to suppress data may be partially based on the servers 102 determining that data 210 has been received from a threshold number of devices.

In an illustrative implementation, device 202(1) may have a predetermined time at which it will contact servers 102 to indicate that it is ready to upload its data 210. In some embodiments, device 202(1) can upload data it has acquired in the last 12 hours, 24 hours, or the like. Similarly, the other devices 202(1)-(N) can have respective periods of time within which each device is programmed to upload data it has recently acquired to the servers 102. In this illustrative implementation, if device 202(1) receives a suppression notification 250 from the server 102 to suppress sending the data 210, the device 202(1) will refrain from sending the data. The device 202(1) may subsequently elect to discard the data 210 without sending it to the server 102. Similarly, the other devices 202(1)-(N) may receive notifications from the servers 102 to halt sending their stored data 210. In some embodiments, a subset of the devices 202(1)-(N) may receive a notification to suppress their corresponding data, so that some of the devices refrain from sending the respective data to the server.

In several embodiments, the notification to suppress may transfer from one device to another, that are within range of each other. For example, one device, such as device 202(1) may receive the suppression notification 250. In response, it may broadcast this suppression notification 250 or any other indication that it received the suppression notification 250 to other devices within communicating range of the device 202(1), such as devices 202(2)-(N). In various implementations, in addition to the suppression notification 250, the device may receive a request from the server to broadcast the suppression notification 250 or any other indication that it received the suppression notification 250 to devices within communicating range of the device 202(1). The device 202(1) may broadcast this signal using known wireless or wired technologies for exchanging data between devices over short distances, such as Bluetooth, near-field communication, and the like. Whether the devices 202(1)-(N) receive the suppression notification 250 via another device or directly from the server, once the devices 202(1)-(N) receive the notification, the devices refrain from generating or sending respective data to the server.

By suppressing the data, the network traffic associated with crowdsourcing can be reduced. The devices need not continue to send the data according to designated or on-demand intervals. Moreover, since the devices do not need to keep sending the collected data, the power involved in uploading that data to the servers 102 may be conserved. This leads to a longer battery life for the devices 202(1)-(N).

Figure 3:
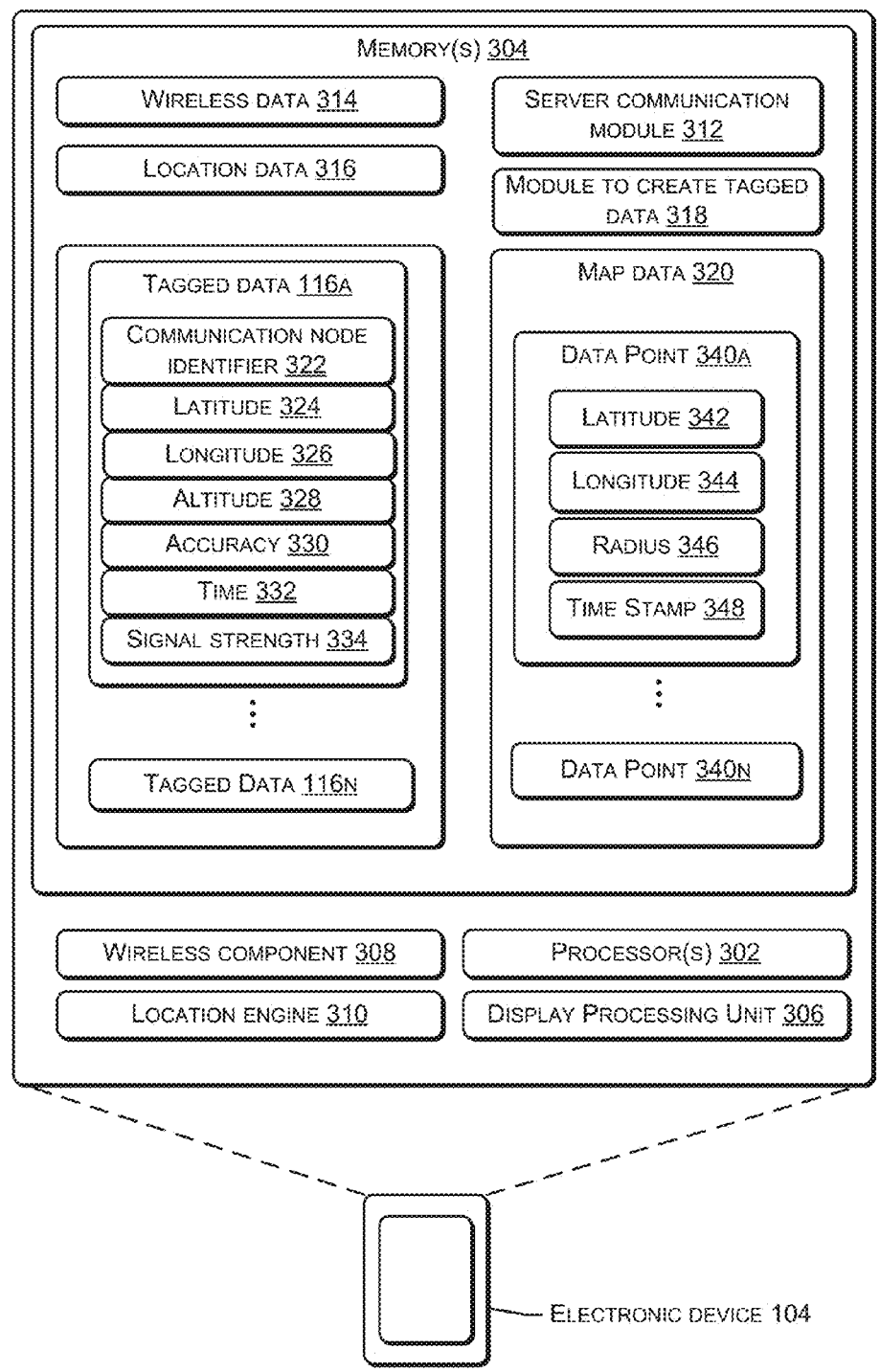
FIG. 3 illustrates an example electronic device that may gather and upload information to the server and refrain from gather or uploading the data to the server after receiving an indication that additional data is not needed.

FIG. 3 illustrates the electronic device 104 (or any of devices 202(1)-(N)) configured to gather data related to the presence of various communication nodes as well as the location of the electronic device. In several implementations, the electronic device 104 can include one or more processors 302, one or more memory devices 304, a display processing unit 306, wireless component 308, and a location engine 310.

The one or more processors 302 may include at least one hardware processors, such as a microprocessor. In some cases, the one or more processors 302 may include a central processing unit (CPU), a graphics processing unit (GPU), or both a CPU and GPU, or other processing units. Additionally, the one or more processors 302 may include a local memory that may store program modules, program data, and/or portions of one or more operating systems. In an illustrative implementation, the one or more processors 302 may also include a cache memory and one or more registers as well as digital electronic circuits such as an arithmetic logic unit (ALU) and a control unit.

In some instances, wireless component 308 may coordinate the exchange of data packets in the form of signals via a wireless local area network. In other implementations, this exchange of data packets may occur via a wireless wide area network. Wireless component 308 may utilize one or more antennas to exchange the data packets or communicate signals over the wireless network. For example, wireless component 308 may utilize the one or more antennas to communicate signals via a wireless local area network. In other embodiments, the wireless component 308 may exchange data packets via Bluetooth and/or Near Field Communication (NFC) technologies. In another example, the wireless component 308 may utilize the one or more antennas to communicate signals via a wireless wide area network. In several implementations, wireless component 308 may scan for the presence of communication nodes within range of the electronic device 104. In several implementations, data corresponding to detected communication nodes may be stored as wireless data 314. In an illustrative example, wireless data 314 may include a communication node identifier, and a signal strength of the detected communication node.

In several implementations, location engine 310 may have the capability to detect the location of the electronic device 104 on the surface of the earth. The location engine 310 may communicate with one or more satellites orbiting the earth via an antenna that is tuned to the frequencies transmitted by the one or more satellites. In various implementations, location engine 310 may determine a location of the electronic device 310 in terms of coordinates and also determine an accuracy of the determined coordinates. For instance, in the case where the electronic device 104 is moving along on a freeway, the accuracy may indicate that the determined coordinates are accurate to a few meters. In another example, when the electronic device 104 is moving along in a downtown area, the accuracy may indicate that the determined coordinates are accurate to a few hundred meters. Additionally, the location engine 310 may also determine an altitude of the electronic device 104 in relation to the sea level. In some instances, the coordinates may be part of a geographic coordinate system, and more particularly a common choice of coordinates may include latitude, longitude, and elevation. In particular, location engine 310 can be a Global Positioning System (GPS) engine. Accordingly, location engine 310 may provide location data 316 in the form of a latitude and longitude position of the electronic device 104 along with an accuracy and altitude.

In addition, the electronic device 104 may include one or more memory(s) 304 that may constitute one or more computer-readable storage media. The one or more memory(s) 304 may include volatile and nonvolatile memory and/or removable and non-removable media implemented in any type of technology for storage of information, such as computer-readable instructions, data structures, program modules or other data. Such memory(s) 304 may include, but is not limited to, RAM, ROM, EEPROM, flash memory or other memory technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, removable storage media, or any other medium that can be used to store the desired information and that can be accessed by a computing device. Depending on the configuration of the electronic device 104, the memory(s) 304 may be a type of tangible computer-readable storage media and may be a non-transitory storage media.

The memory(s) 304 may be used to store any number of functional components that are executable by the one or more processor(s) 302. In many implementations, these functional components comprise instructions or program that are executable by the one or more processor(s) 302 and that, when executed, implement operational logic for performing the operations attributed herein to the electronic device 104. Functional components of the electronic device 104 that may be executed on the one or more processor(s) 302 for implementing the various functions and features related to configuring the electronic device 104 to transmit tagged data in accordance with the methods disclosed herein include: a server communication module 312 and a module to create tagged data 318.

In some cases, the module to create tagged data 318 may correlate wireless data 314 with location data 316 to create tagged data 116a-n. As discussed previously, the wireless data 314 may comprise data corresponding to detected communication nodes. Additionally, as discussed previously, location data 316 may include data corresponding to a detected location of the electronic device 104. In an implementation, the module to create tagged data 318 may correlate wireless data 314 with location data 316 based on when each was acquired, to create tagged data 116a-n. In various implementations, the module to create tagged data 318 may detect that the location engine 310 has been activated and the module to create tagged data 318 may subsequently direct the wireless component 308 to perform a scan for nearby communication nodes.

In other implementations, the module to create tagged data 318 may determine that a scan has been performed within a threshold amount of time of the activation of the location engine 310. In such instances, the module to create tagged data 318 may obtain data for nearby communication nodes from wireless data 314 without initiating a separate scan for nearby communication nodes. The threshold amount of time might be a predetermined amount of time such as a few seconds or a few minutes, and the like. The threshold amount of time may also be calculated based on a projected or observed distance traveled by the device. Accordingly, if the distance traveled by the device is observed or anticipated to be large over a span of minutes (e.g., the device is in a moving car), the threshold amount of time may be determined to be a few seconds. This is due to the fact that data acquired by the wireless component 308 that is older than the determined few seconds may not accurately reflect nearby communication nodes during the time the location engine 310 is activated. In the event that wireless data 314 was not acquired within the threshold amount of time, the module to create tagged data 318 may direct the wireless component 308 to perform a scan for nearby communication nodes. The data obtained via both the location engine 310 and wireless component 308 may be stored as location data 316 and wireless data 314 respectively.

In an illustrative implementation, tagged data 116a-n comprises communication node identifier 322, latitude 324, longitude 326, altitude 328, accuracy 330, time 332, and signal strength 334. In certain implementations, communication node identifier 322 includes the unique device identifier of a communication node, such as communication node 110(1). In this example, the communication node identifier 322 may be a media access control address (MAC address) that may be assigned to the communication node 110(1) by a manufacturer of the communication node 110(1) and stored in the hardware of the communication node 110(1). In other implementations, the communication node identifier 322 may be any other identifier that uniquely identifies the communication node and does not change with a change in network configurations. In one implementation, the communication node identifier 322 may be used as a network address for communications on a physical network segment. In this example, when a device such as the electronic device 104 scans for nearby communication nodes, the electronic device 104 may acquire the communication node identifier 314 corresponding to the communication node 110(1) upon detecting the presence of the communication node. Latitude 324 and longitude 326 may correlate to latitude 216 and longitude 218 as described previously with regards to FIG. 2. Similarly, accuracy 330 and time 332 may also correspond to altitude, accuracy 220 and time 222 as described in FIG. 2. The altitude 328 represents the height of the device, such as measured relative to sea level. In various implementations, signal strength 334 may reflect the signal strength of the communication node.

In several implementation, electronic device 104 may include a server communication module 312. In various implementations, the electronic device 104 may send information to the servers 102 indicating that the electronic device 104 is ready to upload tagged data 116a-n to the servers. As discussed previously, this information may be sent to a single server or multiple servers. In several implementations, the server communication module 312 may communicate via the wireless component 308 to the servers 102. Accordingly, the server communication module 312 may communicate with the servers 102 via a wireless local area network (e.g., Wi-Fi) or a wireless wide area network (e.g., LTE, WiMAX, or other cellular network technologies). In various implementations, the server communication module 312 may receive an indication from the servers to suppress the tagged data 116a-n. Accordingly, the server communication module 312 may halt the operations of the module to create tagged data 318 and/or stop from sending the tagged data that may have already been created by the module 318. The server communication module 312 may also initiate a data flush to delete the stored tagged data 116a-n in response to receiving the indication from the server to suppress tagged data.

The server communication module 312 may query the servers 102 to determine whether tagged data is required for a particular location of the electronic device 104. In an illustrative example, the server communication module 312 may transmit a location of the electronic device 104 in the query to the servers 102. In other implementations, the server communication module 312 may transmit a communication node identifier in the query to the server 102. Additionally, in some cases, the server communication module 312 may coordinate the transfer of map data, such as map data 320 from the server 102 to the electronic device 104.

In various implementations, the map data 320 may include multiple data points 340a, ..., n. Each data point, such as data point 340a, may contain information identifying a location on the surface of the earth. Data point 340a may include a latitude 342, longitude 344 and radius 346. The data points 340a-n may correspond to several locations on the surface of the earth and essentially constitute a map identifying several different areas on the earth. For example, data point 340a may correspond to an area on the earth defined by all points around the intersection of latitude 342 and longitude 344, within a distance of radius 346. Accordingly, map data 320 may contain data points corresponding to areas within a neighborhood, city blocks, a city, a country, or a specific region of the world. In several implementations, each data point 340a-n corresponds to locations at which the servers 102 do not need to acquire corresponding tagged data. Accordingly, if the electronic device 104 is present in a location identified by one of the data points 340a-n, the electronic device 104 may refrain from creating or sending tagged data corresponding to that location. Additionally, data point 340a includes a time stamp 348 that may indicate when that data point is set to expire.

In an illustrative implementation, the electronic device 104 may activate the location engine 310 to determine a location of the electronic device 104. In some cases, the location engine 310 may be activated by an application that requires a location of the electronic device 104. In various implementations, the module to create tagged data 318 may detect the initiation of the location engine 310 and it may utilize wireless component 308 to obtain wireless data 314. Accordingly, the wireless component 308 may scan for the presence of communication nodes and store data corresponding to detected communication nodes as wireless data 314. In some implementations, the module to create tagged data 318 may correlate the wireless data 314 with location data 316 to create tagged data 116a-n.

In various implementations, the server communication module 312 may determine that a predetermined duration of time has passed and query the servers 102 to verify that the servers 102 needs the tagged data 116a-n. In other implementations, the server communication module 312 may query the servers 102 after determining that a threshold amount of tagged data 116a-n has accumulated in the memory 304. The server communication module 312 may send a communication node identifier, such as communication node identifier 322, in its query to the server. In various implementations, the servers 102 may respond with a notification to suppress the tagged data 116*a*-*n*. Alternatively, the servers 102 may respond with a notification to suppress the tagged data that correlates to a specific communication node identifier or a particular latitude and longitude. In various implementations, the server communication module 312 may receive the notification from the server in the form a single bit. In an illustrative implementation, based on the way the servers 102 and the electronic device 104 are configured, the servers 102 may return a 0 or a 1 to confirm that the tagged data 116*a*-*n* should be sent. In some implementations, the server communication module 312 may filter the tagged data accordingly and send the remaining tagged data to the servers 102. Alternatively, the server communication module 312 may discard the tagged data that needs to be suppressed.

Additionally, the server communication module 312 may also utilize the wireless component 308 to communicate with other devices within range of the electronic device 104. For example, when the server communication module 312 receives a notification to suppress the tagged data that correlates to a specific communication node identifier or a particular latitude and longitude, the server communication module 312 may utilize the wireless component 308 to broadcast to the other devices that it received a notification to suppress. The wireless component 308 may broadcast the notification using Bluetooth or NFC technologies. In some instances, the notification may include information about the location of the electronic device 104 as well as an indication that it received a notification to suppress tagged data. In other instances, the notification may include information provided by the server, such as the notification to suppress. In other cases, the wireless component 308 may detect the presence of another electronic device and subsequently send the notification to the other electronic device.

In some implementations, the server communication module 312 may coordinate the transfer of map data 320 from the server to the electronic device 104. Additionally, the server communication module 312 may coordinate the transfer of map data 320 to other devices within the vicinity of the electronic device 104. In some cases, the electronic device may detect the presence of other electronic devices and initiate a transfer of map data 320 to the other electronic devices. The map data 320 may be distributed to other devices using any wireless, wired, Bluetooth or NFC technologies.

In some instances, the server communication module 312 may detect that the electronic device 104 has changed locations and send a query to the servers 102 to determine whether the servers 102 needs tagged data corresponding to the new location. In an illustrative implementation, the electronic device 104 may detect that it has moved from California to Manhattan and query the servers 102 to determine whether it should generate and send tagged data. In some cases, the server communication module 312 may receive a notification from the servers 102 that data should be suppressed for the new location.

In these cases, the server communication module 312 may direct the module to create tagged data 318 to refrain from generating any tagged data. The module to create tagged data 318 may be turned off or placed in a certain mode of operation by the server communication module 312. Accordingly, the module to create tagged data 318 may refrain from engaging the wireless component 308 to scan for nearby communication nodes in response to detecting the activation of the location engine 310. Alternatively, the module to create tagged data may refrain from determining whether location data 310 was acquired within a threshold amount of time of the activation of location engine 310. In some implementations the module to create tagged data 318 may refrain from generating tagged data until the location engine 310 detects a new location of the electronic device 104. In other implementations, the module to create tagged data 318 may refrain from creating tagged data for a predetermined period of time. In yet other implementations, the module to create tagged data 318 may refrain from creating tagged data until it receives a notification to do otherwise from the server communication module 312.

In various implementations, when the module to create tagged data 318 refrains from creating tagged data, the electronic device 104 may save on power. As discussed above, by refraining from creating tagged data, the module 318 will not activate the wireless component 308 when location engine 310 is activated. In several implementations, utilizing the wireless component 308 to scan for nearby communication nodes can use a significant amount of battery power. By refraining from performing the scan, the electronic device 104 will save power. Additionally, in several implementations when the electronic device 104 refrains from sending any tagged data, a significant amount of network bandwidth is free for other uses.

Figure 4:
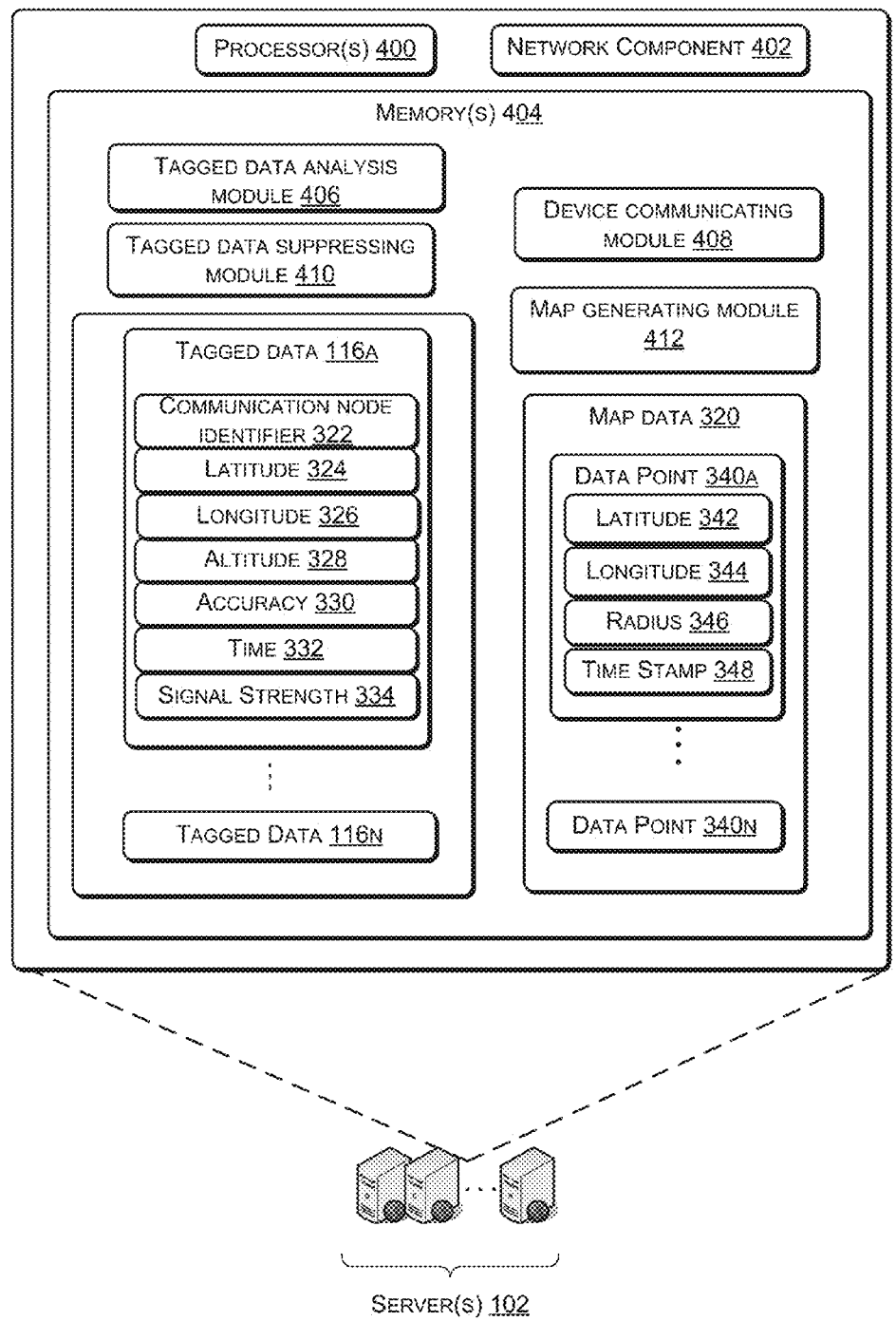
FIG. 4 illustrates an example server that may store the data received from electronic devices and notify electronic devices whether additional data is needed.

FIG. 4 illustrates the servers 102 configured to gather data related to the locations of various communication nodes. Although one set of servers 102 is illustrated in the system 100 described with regards to FIG. 1, multiple sets of servers may be used by different entities to collect data related to the locations of various communication nodes. Further, each set of servers may have one or multiple servers. For discussion purposes, the components described in FIG. 4 will be discussed as residing in a single server 102. The server 102 may include a number of components related to gathering data corresponding to the locations of various communication nodes. For example, the server 102 may include one or more processors, such as the representative processor 400. The processor 400 may include a hardware processing unit, such as a central processing unit, a graphics processing unit, or both. Additionally, the processor 400 may include a local memory that may store program modules, and/or program data. In an illustrative implementation, the processor 400 may include a cache memory and one or more registers as well as digital electronic circuits such as an arithmetic logic unit (ALU) and a control unit. The server 102 may also include input/output devices that may include one or more display devices, such as a liquid crystal display, a touch screen display, a display utilizing another type of display technology, or a combination thereof. The input/output devices may also include a keypad, a keyboard, a pointer device, one or more speakers, combinations thereof, and the like.

The server 102 also includes a network component 402 which implements network connectivity for the server 102. The network component 402 enables the server 102 to communicate with other devices where the communication is typically achieved by exchanging discrete data packets or frames over network signal lines such as twisted pair, coaxial, optical fiber, telephone lines, satellites, microwave, relays, modulated AC power lines, infrared wireless, or other conventionally known data transmission systems. In several implementations, the network component 402 may also enable the server 102 to communicate over a wireless network such as a wireless local area network or a wireless wide area network.

Several implementations of the server 102 may include one or more memory devices, such as memory 404. Memory 404 may include, but is not limited to, RAM, ROM, EEPROM, flash memory, one or more hard disks, solid state drives, optical memory (e.g., CD, DVD), or other non-transient memory technologies. In an implementation, at least a portion of the data stored by the memory 404 may be located remotely from the server 102 and be accessible by a number of computer devices of the server 102. In some cases, the memory 404 may be accessible by third parties.

The memory 404 is utilized to store data corresponding to the locations of communication nodes, received from devices such as the electronic device 104. Additionally, the memory 404 may maintain information that is utilized to provide a location of a communication node to a device, such as the electronic device 104. In an illustrative implementation, once the server 102 accumulates enough information regarding the locations of various communications nodes in a given area, it may send a notification to suppress tagged data to the electronic device 104 or other devices such as the electronic device 104 located in the given area. Accordingly, the memory 404 may store one or more of the following modules: tagged data analysis module 406, device communicating module 408, tagged data suppressing module 410, map generating module 412, as well as tagged data 116a-n, and map data 320.

In various implementations, tagged data 116a-n may include data received from the electronic device 104. As discussed with regards to FIG. 3, in several embodiments, this data is acquired by the electronic device 104 when the device's location is determined as well as during a scan performed to detect nearby communication nodes. As also discussed with regards to FIG. 3, tagged data 312 may include among other data, a communication node identifier 314, a latitude 316, a longitude 318, an altitude 320, an accuracy 322, and a time 324. As a person having ordinary skill in the art will recognize, the amount of data collected by the electronic device 104 over a period of time is enormous. The electronic device 104 may typically be unable to store such enormous datasets within local device memory. Accordingly, the server 102 has enough memory to store this data from electronic device 104 as well as other electronic devices similar to electronic device 104.

In several implementations, the tagged data analysis module 410 may receive the tagged data from various devices such the electronic device 104. In several cases, the tagged data analysis module 410 may receive the data on a periodic basis from each electronic device, i.e., every 12 hours, every 24 hours, etc. In other cases, the tagged data analysis module 410 may receive a certain amount of data from various electronic devices.

Additionally, the tagged data analysis module 406 may analyze the stored tagged data such as tagged data 116 a-n to determine a location of an electronic device. In an illustrative implementation, an electronic device might be present in an area where GPS signals are difficult to detect, such as when an electronic device is indoors or underground or due to weather conditions. In this example, the electronic device might detect communication nodes near its current location and send these detected communication nodes to a location database server such as server 102 in a query prompting the server for a location. In turn, the server 102 may determine via the tagged data analysis module 406 whether it has any tagged data, such as tagged data 116a-n that corresponds to the communication nodes currently being detected by the electronic device. In its initial query, the electronic device may send the communication node identifiers of the detected communication nodes. During its determination, the tagged data analysis module 406 may identify which tagged data is relevant to the query by searching for the communication node identifiers that match the identifiers that were received from the electronic device. If the server tagged data analysis module 406 identifies a sufficient amount of tagged data to determine where these detected communication nodes might be located, then the tagged data analysis module 406 will respond with a location. Otherwise, the tagged data analysis module 406 may respond with an error message or any other known message to indicate that the query was unsuccessful due to the tagged data analysis module 406 lacking sufficient data to determine a location of the device. In several cases, the ability of the server 102 to determine the approximate location of an electronic device is particularly helpful when an electronic device is not within a clear line of sight to GPS satellites. Additionally, in particular situations, this method for determining the location of an electronic device may be a faster than using GPS services.

In several implementations, the device communicating module 408 may receive notifications from the electronic device 104 that it is ready to upload tagged data to the server. In many cases, the device communicating module 408 may communicate with the electronic device 104 via the network component 402. As this tagged data is acquired by the server 102, a significant amount of network bandwidth is utilized. For example, each electronic device may collect tagged data over a time period of days or weeks. After a certain time period, the electronic device 104 will need to upload the data to the server 102. As mentioned with regards to FIG. 3, the electronic device 104 may be programmed to upload to a single server or multiple servers. Each server may belong to one vendor such as Google or Amazon. In the case where the electronic device uploads to multiple location servers, each location server may be owned by a different vendor. In one implementation, the frequency at which the electronic device 104 uploads the tagged data is predetermined. For example, the electronic device may upload the tagged data every 24 hours or 48 hours. In another implementation, the electronic device 104 may upload the tagged data once a threshold amount of the electronic device's memory is occupied by the tagged data. For example, the electronic device may upload the tagged data after some threshold percentage (e.g., 25 percent) of the phone's memory is used up.

One skilled in the art will recognize that uploading the tagged data can utilize a significant amount of network data. For example, an electronic device 104 may utilize 20-24 bytes of data per each communication node that it detects. During an upload an electronic device might have relevant data for hundreds of detected communication nodes; accordingly per upload, each electronic device might need to send 2400 bytes of data. In a densely populated area, such as Manhattan, where close to a million device might be present at any given time, the data that is transmitted by all the electronic devices in the area is fairly large. This is helpful for acquiring the initial data sets needed to create a robust database that contains sufficient data and is able to effectively determine the location of an electronic device based on detected communication nodes. However, after a sufficient amount of data has accumulated in the server 102, additional data becomes redundant and unnecessary for determining the location of an electronic device. That is, the server 102 ability to accurately determine the location of an electronic device does not increase with the addition of more tagged data. Accordingly, the memory 404 may store data corresponding to the locations of communication nodes 110(1)-(N) from devices such as the electronic device 104.

In various implementations, the device communicating module 408 may send a notification to suppress tagged data to the electronic device 104 in response to receiving an indication from the tagged data suppressing module 410. In other implementations, the device communicating module 408 may send a notification to suppress to several electronic devices without receiving a request to upload data from these devices or any other type of prior contact from these devices. Additionally, the tagged data suppressing module 410 may determine that additional tagged data is currently not needed for a particular communication node or a particular location. In some implementations, the tagged data suppressing module 410 may determine that it has acquired a threshold amount of data corresponding to a particular communication node. That is, the server may determine that it may estimate the actual location of the communication node with enough confidence given the amount of tagged data the server has accumulated related to the communication node. Accordingly, tagged data suppressing module 410 may determine that acquiring additional tagged data within close proximity of the communication node will not increase the server's accuracy in determining the location of an electronic device.

To determine that additional tagged data is currently not needed for a particular communication node, the tagged data suppressing module 410 may determine that a sufficient amount of data is stored from a variety of electronic devices located in various positions such that the location of the particular communication node may be determined. The server may estimate the actual location of the communication node using various techniques such as finding a centroid of all the latitudes and longitudes received from various devices.

In various implementations, when an electronic device queries the server 102 about whether additional information is needed for that communication node, the tagged data suppressing module 410 may indicate to the device communication module 408 that this data should be suppressed. In some embodiments, the server 102 may additionally send a request to the electronic device to notify other devices within the electronic device's vicinity to also suppress data corresponding to the communication node. In an illustrative implementation, the device communication module 408 may receive a query about communication module 110a. The query may include a communication node identifier 322. The tagged data suppressing module 410 may determine that additional tagged data corresponding to communication node identifier 322 is not needed. Accordingly, the device communicating module 408 may transmit a single bit to indicate to the electronic device 104 to suppress and ceasing sending the tagged data corresponding to communication node identifier 322.

In several other implementations, the tagged data suppressing module 410 may determine that the server has acquired sufficient data for a particular area and that additional data corresponding to the communication nodes within the area will not increase the accuracy of the ability of server 102 to discern the location of an electronic device. In an illustrative implementation, the tagged data suppression module 410 may determine that it has acquired data corresponding to some threshold level (e.g., 90 percent) of the communication nodes present in a city. In various implementations, the tagged data suppressing module 410 may determine that after it has acquired data corresponding to 90 percent of the communication nodes present in the city, data corresponding to additional communication nodes with the city would not increase the accuracy for determining a device's location based on the stored tagged data. For example, the tagged data suppressing module 410 may determine that it has acquired information corresponding to a few hundred communication nodes at a location X within a radius of 50 meters. The addition of tagged data corresponding to more communication nodes within 50 meters of location X will not help increase the ability of the server 102 to accurately determine the location of an electronic device within location X. In this illustrative implementation, it may be that the electronic device does not require a location that is more accurate than 50 meters within location X. In these cases, the tagged data suppressing module 410 may determine that it does not need additional tagged data corresponding to location X within a radius of 50 meters.

In another example, the tagged data suppressing module 410 may determine that it contains a certain percentage of data for a given city. After the tagged data suppressing module 410 determines that the server 102 has accumulated this percentage of data, module 410 may determine that it does not need additional data as this additional data would not likely improve the accuracy of determining the location of a device. The tagged data suppressing module 410 may maintain a predetermined threshold corresponding to the amount of data it needs to acquire for a given city. Once the server 102 acquires data equal to or greater than the predetermined threshold amount, the tagged data suppressing module 410 may determine that it does not need additional tagged data corresponding to the given city.

Additionally, in certain implementations, the tagged data suppressing module 410 may include in its determinations of whether sufficient data is present in the server 102, an analysis of whether the stored tagged data has expired. In several implementations, the tagged data suppressing module 410 may determine that data is currently not needed for a particular location or particular communication node, by analyzing a time, such as time 332 to ascertain whether the data stored in the memory 404 is reliable. In some implementations, if data is older than a few months, the data may be discarded. In other implementations, the data may expire based on a weighting scheme. For example, for every day past the time stamp, such as time 322, received with the tagged data, such as tagged data 116a, the weightage assigned to the tagged data, may be reduced by some predetermined percentage.

In various implementations, once the tagged data suppressing module 410 has determined that additional data is not required for a particular location, it may update a map such as map data 320 via the map generating module 412. In various implementations, the map data 320 may contain multiple data points 340a, ..., n, where each data point contains a latitude 342, a longitude 344 and a radius 346. In this implementation, each data point corresponds to a location within which additional tagged data is not required by the server 102. In various embodiments, the map generating module 412 may analyze the tagged data 116a-n to determine which latitude and longitude locations contain sufficient data such that additional tagged data for those latitude and longitude locations would not increase the accuracy. In these cases, the map generating module may generate an additional data point to reflect the locations that do not require additional tagged data.

Additionally, in several implementations, the map generating module 412 may provide an expiration date corresponding to the map data 320. This expiration date may correspond to a date after which the map data 320 may no longer be accurate. For example, in cases where the location of a communication node might change, the server 102 may need to refresh the tagged data 116a-n such that it reflects the new location of the communication node. In such instances the map data 320 may also be updated by the map generating module 412. Accordingly, the electronic device 104 would need to download the updated map data 320 so it continues to send the correct information required by the server 102. In several implementations, the expiration date may be a simple time stamp, such as time stamp 348, indicating to the electronic device 104 a time at which the electronic device should download new map data. In other implementations, the electronic device 104 may query the server 102 at predetermined intervals of time to determine whether new map data is available for download.

In various implementations, the device communicating module 408 may receive a query from the electronic device 104 prior to receiving tagged data. In other implementations, the device communicating module 408 may receive a query about a location of the electronic device 104. In several implementations, this may occur when the electronic device 104 determines it is in a new location. For example, if the electronic device 104 determines that its location has changed from California to Manhattan, it may contact the server 102 to determine whether the server 102 would like tagged data corresponding to the Manhattan area.

The device communicating module 408 may transfer the map data to the electronic device 104 after receiving a query for the map. In some cases, the device communicating module 408 may also transfer a request to the electronic device 104 to suppress data in areas or locations included in the map data. In other instances, the server 102 may detect that an electronic device 104 or several electronic devices are within a certain area or projected to be in a certain area and transfer map data 320 to the devices via the device communicating module 408. For example, the server may determine that the device has a high likelihood of traveling from California to New York during a given week based on information stored in a calendar on the device. The server may then transfer map data 320 or a subset therefrom correlating to areas within New York in anticipation of the travel. In other implementations, the server 102 may send map data to the electronic device 104 along with a request that the electronic device 104 distribute this map data to other devices within range of the electronic device 104.

FIGS. 5, 6, 7, and 8 are flow diagrams illustrating example processes for gathering data related to the locations of various communication nodes. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types. The order in which the operations are described should not be construed as a limitation. Any number of the described block can be combined in any order and/or in parallel to implement the process, of alternative processes, and not all of the blocks need to be executed. For discussion purposes, the processes herein are described with reference to the frameworks, architectures and environments described in the examples herein, although the processes may be implemented in a wide variety of other frameworks, architectures or environments.

Figure 5:
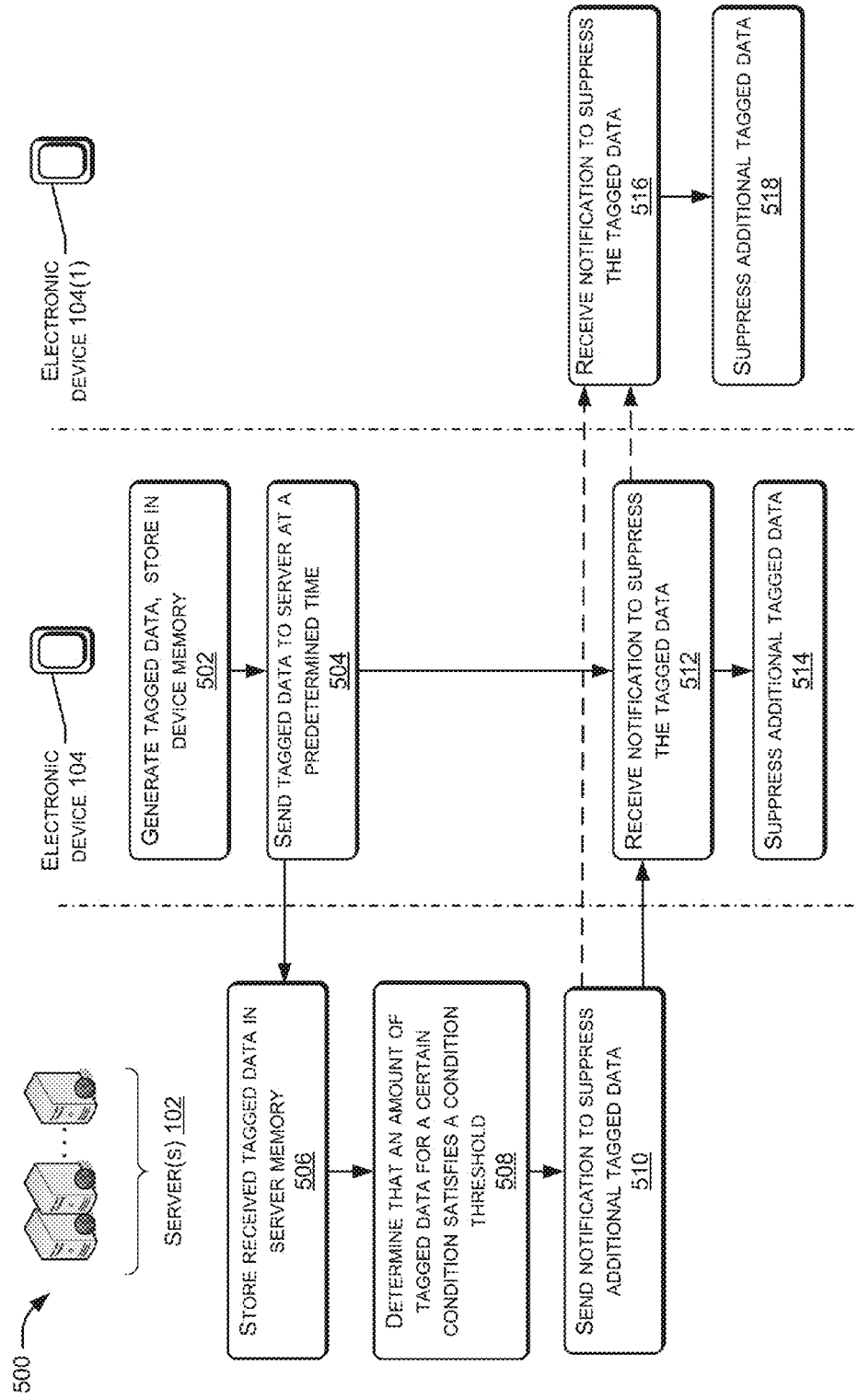
FIG. 5 illustrates a flow diagram of an example process for reducing crowdsourcing network traffic by aggregating data over time from plural devices and subsequently suppressing receipt of additional data.

FIG. 5 illustrates a process 500 for an enhanced crowdsourcing technique that reduces network traffic. The process 500 may be performed in part by the server 102 and in part by the device 104. At 502, an electronic device 104 may generate tagged data and store it in device memory. In various implementations, the tagged data may include information corresponding to the location of the electronic device and communication nodes it has detected while positioned at that location. At 504, the electronic device may send the tagged data to a server at a predetermined time. For example, the electronic device 504 may be configured to send the tagged data every 12 hours, 24 hours, on a weekly basis, etc. In various implementations, the electronic device may send the tagged data when the tagged data occupies a threshold amount of device memory.

At 506, the server receives the tagged data and stores it in server memory. At 508, the server may determine that additional tagged data for a certain condition satisfies a condition threshold. In various implementations, the server may determine that it has received enough information about a communication node that is geometrically diversified, and that additional data for the communication node is not needed. In other implementations, the server may determine that is has enough information about the communication nodes in a given area and hence, additional data corresponding to the communication nodes is not required in the given area. Additionally, the server may determine that it has received location data from a threshold number of electronic devices.

At 510, the server may send a notification to suppress any additional tagged data to the electronic device. In various implementations, the server may send this notification in response to the electronic device querying the server about a particular communication node or a particular location. In other implementations, the server may push geographic locations to the electronic device, corresponding to locations where tagged data is not required. In additional implementations, the server may push a suppression notification to one or more devices, as shown by the dotted line from 510 to 516, after determining that a threshold amount of data for a wireless access point is stored on the server or that a threshold amount of data for a particular geographical area has accumulated in the server. In these cases, the server may send this notification without being contacted by the device initially. In other implementations, the notification may be sent after a device has contacted the servers 102. For example, the servers 102 may receive tagged data from two devices and subsequently the servers 102 may be able to determine the location of a communication node based on the tagged data. When a third electronic device requests to send additional tagged data about the communication node, the server may send a notification to not send the additional tagged data after a determination that the tagged data from the first two devices meets a threshold amount. As discussed previously, various conditions may be assessed by the server to determine that a suppression notification should be sent to one or more devices.

At 512, the electronic device 104 receives the suppression notification. At 514, the electronic device 104 may suppress additional tagged data. In various implementations, this may include refraining from performing a scan for communication nodes when a location service is activated on the electronic device, or ceasing from sending any more tagged data about network nodes and the like to the server. In other implementations, the electronic device may delete any current tagged data.

Alternatively, as discussed previously, at 516, the electronic device 104(1) may receive the suppression notification from the server without having contacted the server 102. Electronic device 104(1) is a device similar to electronic device 104. The electronic device 104(1) may receive this notification after the server 102 detects that it is in an area in which the server 102 does not need tagged data. For example, the servers 102 may have generated map data for a particular geographical region. The servers 102 may detect that a device is in the particular geographical region and send the map data to the device without being contacted initially by the device. In other implementations, at 516, the electronic device 104(1) may receive the suppression notification from electronic device 104. This may occur after the servers 102 sends a request to the electronic device 104 to broadcast a suppression notification to other devices within range. The suppression notification may be a replica of the original suppression notification received by the electronic device 104 or an indication that it received the suppression notification or some modified version of the original suppression notification received from the server. As discussed above, in scenarios where the electronic device 104(1) is within communicating range of the electronic device 104, it may receive a broadcast message from device 104 to suppress tagged data in the area. At 518, the electronic device 104 may suppress additional tagged data. As discussed previously, in several implementations, this may include refraining from performing a scan for communication nodes when a location service is activated, ceasing from sending any more tagged data about network nodes and the like to the server, refraining from creating any more tagged data, and the like.

Figure 6:
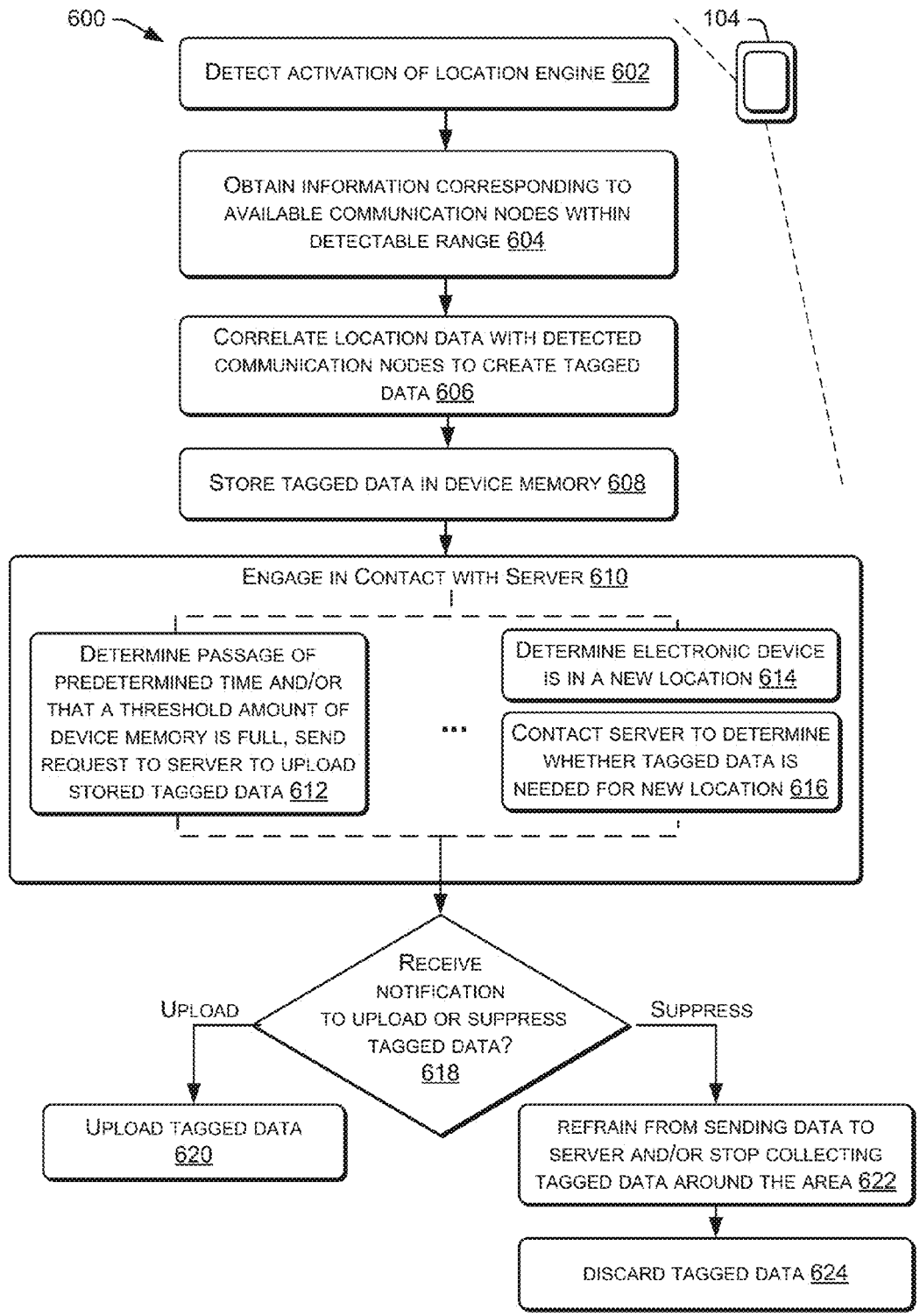
FIG. 6 illustrates a flow diagram of an exemplary process that an electronic device may implement to gather data about network access points within a region, and sending that data in association with the device location to a server.

FIG. 6 illustrates a process 600, implemented by an electronic device 104, to gather tagged data and send the tagged data to a server. At 602, the electronic device may detect the activation of its location engine. For example the electronic device may activate a GPS engine resident on the device to determine location data for the device. In various implementations, the location engine may be activated in response to an application requesting the location of the electronic device. At 604, in response to detecting the activation of the location engine, the electronic device may obtain information corresponding to available communication nodes within detectable range. This information may include a MAC address or SSID of the communication node as well as a signal strength value of the communication node detected by the electronic device. As discussed previously, to obtain this information the device may initiate a scan to detect communication nodes within range of the device in response to detecting the activation of the location engine. Obtaining information corresponding to available communication nodes may also include using information from a scan for detecting communication nodes conducted prior to the activation of the location engine. If any communication nodes are detected, the electronic device stores a communication node identifier and signal strength associated with each detected communication node. At 606, the electronic device may correlate its own location data with information pertaining to each of the detected communication nodes to generate tagged data. The tagged data may include a device identifier associated with the device, the latitude and longitude of the current location of the device, the MAC address of the communication node, the signal strength value, and a time that the tagged data was generated. Accordingly, in various implementations, the electronic device may correlate the latitude and longitude of its location with the data corresponding to each detected communication node. Through this correlation, the communication nodes are essentially identified or tagged as being associated with the device location, thereby forming tagged data. At 608, the electronic device may store the tagged data in device memory.

At 610, the electronic device 104 may initiate contact with the server. The electronic device 104 may initiate contact by sending a request to transmit the tagged data to the server and include a MAC address of the communication node or the location data of the device in the request. The device 104 may initiate contact in any number of ways, including periodically, at predetermined time intervals, after a particular time lapse, following a change in location, in response to a request from the server, or any number of possible events. For discussion purposes, two possible options are illustrated—a first path through act 612 and/or a second path through acts 614 and 616—which may be based on a configuration of the electronic device. In various implementations, an electronic device may be configured to perform several of the engagement processes at different times.

At 612, the electronic device may determine that a predetermined amount of time has passed or that a threshold amount of device memory is full and send a request to the server to upload stored tagged data. In various implementations, the electronic device may be configured to send any stored tagged data at a predetermined interval of time. In other implementations, the electronic device may be configured to send the stored tagged data after a certain amount of device memory is used up. As mentioned previously, in some case, the request may include a communication node identifier or a latitude and longitude.

Alternatively or at a different time, at 612, the electronic device may discover that it is in a new location. At 614, the electronic device may contact the server to determine whether tagged data is needed for the new location. In several implementations, the electronic device may send the coordinates of its location to the server in a query.

At 618, the electronic device may alternatively receive acceptance instructions to upload the tagged data or a suppression notification to suppress the tagged data. If the electronic device receives instructions to upload (i.e., the "upload" path from 618), the electronic device uploads the tagged data to the server at 620. For example, the server may have accumulated a certain amount of data for a particular communication node or a particular geographical location in memory. It may determine that some of the data has expired and when it receives a request to transfer data for the particular communication node or geographical area, it may send a notification to proceed with uploading additional tagged data. In other instances, the server may determine that an insufficient amount of tagged data has been collected and approve requests to transfer data until a threshold amount of tagged data is stored. In various implementations, the tagged data sent to the server may include communication node identifiers, a latitude, a longitude, a time, an altitude, an accuracy, a signal strength, and any number of other information of each communication node. In various implementations, this tagged data may be a compilation of data created during an interval of time. For example, the tagged data may have been compiled by the electronic device in the last 12 hours.

On the other hand, if the electronic device receives a notification to suppress (i.e., the "suppress" branch from 618), the electronic device may refrain from sending location data to the server and/or stop collecting tagged data around an area at 622. In various implementations, the electronic device may send a query a specific communication node. Upon receiving the notification to suppress, the electronic device may refrain from sending the tagged data corresponding to the communication node to the server. In other implementations, the electronic device may have sent coordinates corresponding to a location of the electronic device. In response to receiving the notification to suppress, the electronic device may refrain from scanning the area for any possible communication nodes. By taking these actions, the electronic device may save power, as it refrains from performing a scan that it would have otherwise done. Additionally, by refraining from sending tagged data in response to a notification to suppress, network bandwidth is available for other transfers of data that might have otherwise been used up to send unnecessary tagged data.

At 624, following receipt of the suppression notice, the electronic device may optionally discard the tagged data.

Figure 7:
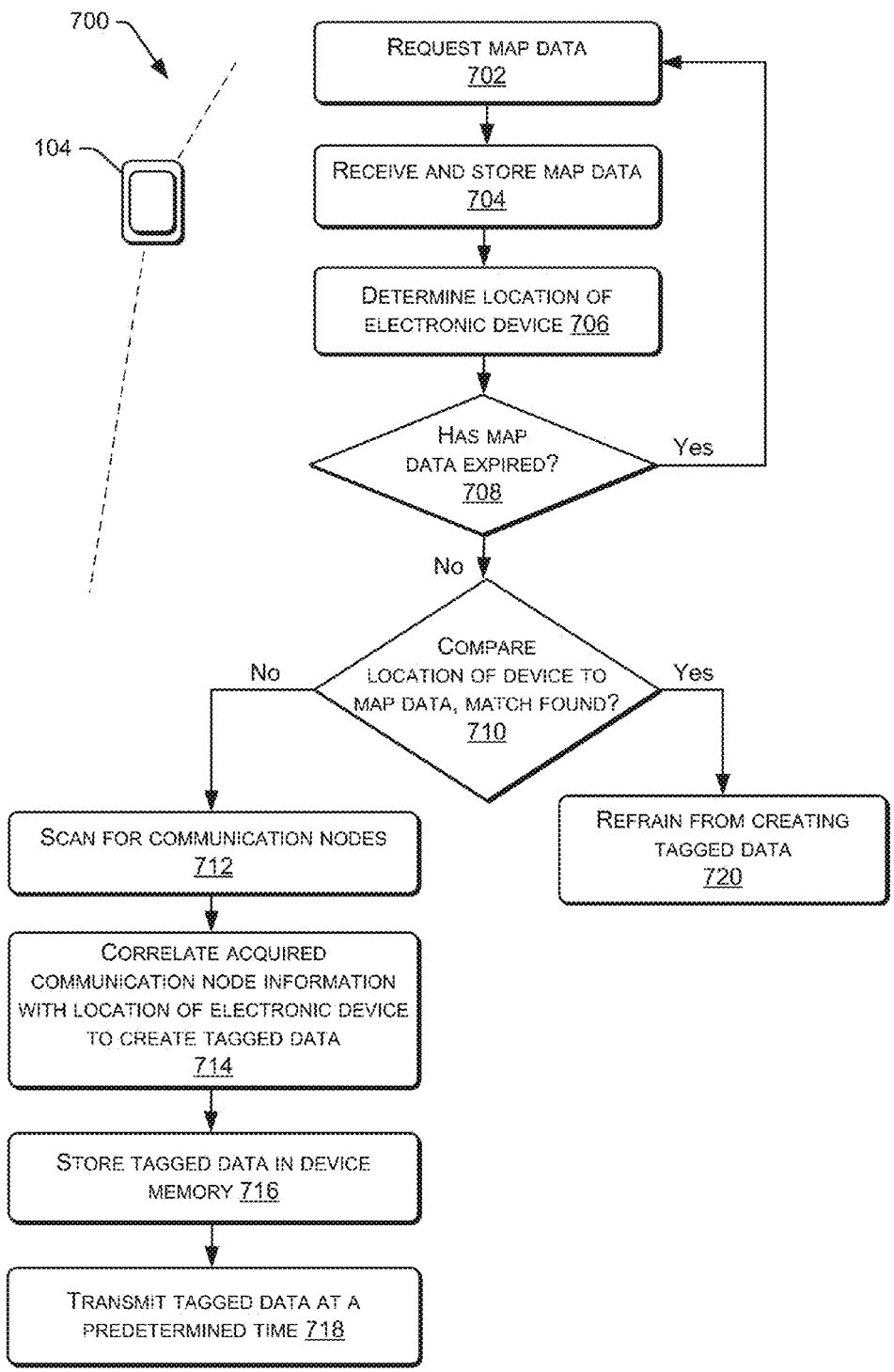
FIG. 7 illustrates a flow diagram of another exemplary process that an electronic device may implement to gather data about network access points.

FIG. 7 illustrates another process 700 that an electronic device may implement to gather tagged data and send it to a server. At 702, the electronic device may request map data from the server. In various implementations, the map data may include a geographical region or various locations defined by latitude, longitude, altitude, radius, and the like. At 704, the electronic device may receive these various locations as part of the map data and store the map data within local memory. The map data may include an expiration identifying when the map data is considered stale. As discussed above, the electronic device 104 may receive the map data may be from a server, such as server 102, or from another electronic device within communicating range of device 104. At 706, the electronic device may determine a location of the electronic device, such as by activating a location engine and determining a latitude and longitude at which the electronic device is located.

At 708, it is determined whether the map data stored within the device memory has expired. In various implementations, the device may compare the current date to the expiration date received from the server as part of the map data. In other implementations, the electronic device may be configured to determine if a predetermined amount of time has passed and automatically request new map data from the server. In additional implementations, the server may send the map data along with an indication of a duration of time during which the map data is valid. If the electronic device determines the map data has expired (i.e., the "yes" branch from 708), the device requests new map data at 702.

On the other hand, if the electronic device determines that the map data currently stored within its memory has not expired (i.e., the "no" branch from 708), the device compares its current location to locations present within the map data at 710. If the current location of the electronic device does not match any of the locations provided in the map data (i.e., the "no" branch from 710), the electronic device may scan for nearby communication nodes at 712. As nodes are found, the device stores data including identifiers of the detected communication node and associated signal strengths. At 714, the electronic device may correlate acquired communication node information with the location of the electronic device to create tagged data. At 716, the electronic device may store the tagged data in device memory temporarily and at 718, the electronic device may transmit the tagged data at a predetermined time.

Returning to 710, if the electronic device determines that the current location of the electronic device corresponds to one of the locations within map data (i.e., the "yes" branch from 710), the electronic device refrains from creating tagged data at 720. In various implementations, this may include refraining from performing a scan for nearby communication nodes when the electronic device detects the activation of a location engine. By refraining from performing a scan that it would otherwise perform, the electronic device saves power. In other implementations, the device may perform the scan for nearby communication nodes but then refrain from generating tagged data. For example, the device may obtain an additional MAC address of a communication node within detectable range of the device but then determine new location data of the device where the new location data is different from prior location data. Based on determining that the new location data corresponds to a location identified by the map data, such as a location within the geographical region included in the map data, the device may refrain from generating new tagged data for the additional communication node detected by the device.

Figure 8:
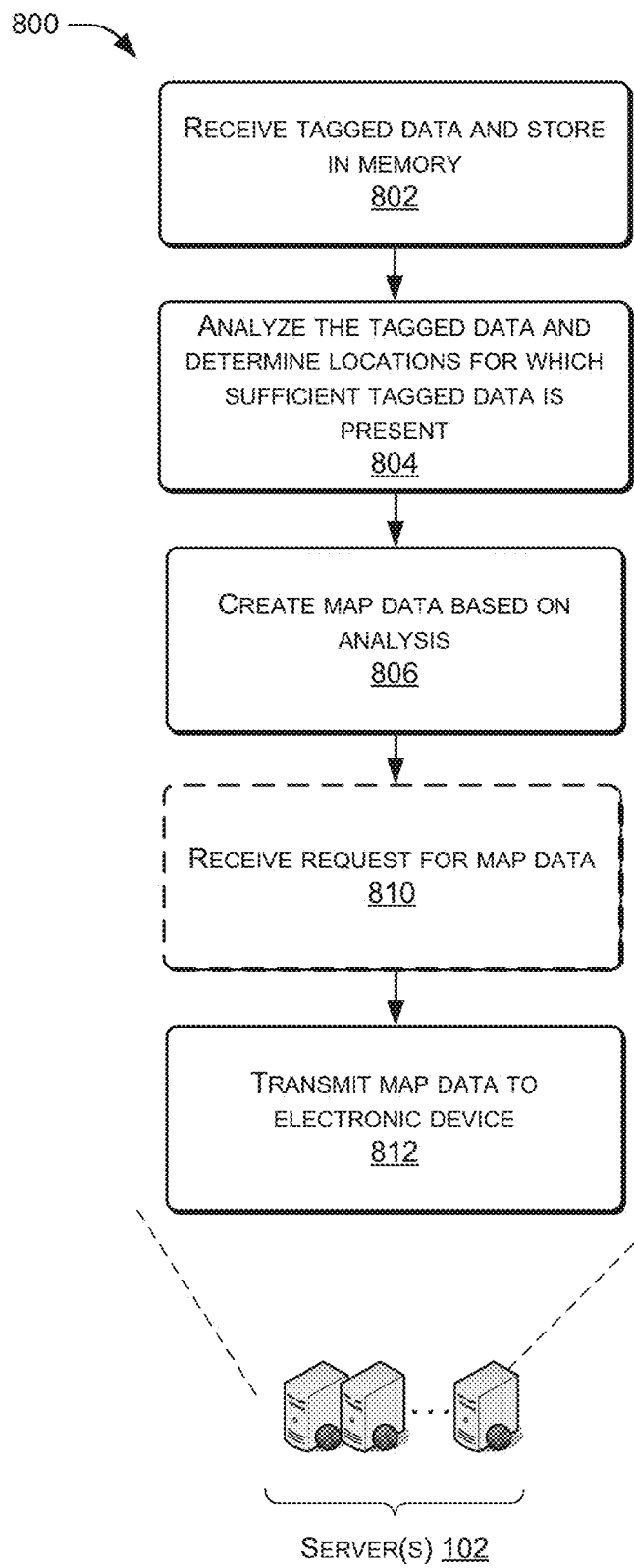
FIG. 8 illustrates a flow diagram of a process that a server may implement to create map data of areas within which additional data about network access points is not needed.

FIG. 8 illustrates a process 800 that the server(s) 102 may implement to create map data. At 802, the server may receive tagged data from multiple devices in various geographical locations, which may represent multiple communication nodes. In some implementations, the tagged data may have been accumulated for a period of time such as many months or a year. The server stores the tagged data in memory. At 804, the server may analyze the tagged data and determine certain locations for which sufficient tagged data is present. In various implementations, the server may determine that a threshold amount of data has been received for a certain area. For example, the server may determine that it has accumulated data for a threshold amount (e.g., 90 percent) of the communication nodes in Manhattan. In other implementations, the server may determine that a threshold amount of data for a particular communication node is stored on the server.

Accordingly, the server, at 806, may create map data based on the analysis. In addition to creating the map data, in some implementations, the server may also send an individual notification to devices in communication with the server to refrain from transmitting tagged data for a particular wireless access point or a particular geographical area or region. Continuing the previous example, the server may include a latitude and longitude corresponding the various nodes in and around Manhattan and also calculate a radius which captures the area within which it has accumulated data for 90 percent of the communication nodes in Manhattan.

At 810, the server may receive a request for map data from an electronic device. As discussed above, in several implementations, the server may not receive a request for map data and instead push the map data to several devices in a certain area or after determining that a device will be located in a certain area in the future. In several cases, the map data is pushed to the devices without requiring a request for the map data. And 812, the server transmits the map data to the electronic device. In various implementations, the server may also transmit a time after which the map data is considered expired.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A method comprising:
receiving, from a first electronic device, first data including location data of the first electronic device and data corresponding to a communication node located in an area;
receiving, from a second electronic device, second data including location data of the second electronic device and the data corresponding to the communication node;
determining a location of the communication node, based at least in part on the location data of the first electronic device and the location data of the second electronic device;
receiving, from a third electronic device, a request to send third data including the data corresponding to the communication node; and
sending, to the third electronic device, a notification to not send the third data.
2. The method as recited in claim 1, wherein the first data further includes a device identifier of the first electronic device, and the location data of the first electronic device includes a first latitude and a first longitude information,
wherein the second data further includes a device identifier of the second electronic device, and the location data of the second electronic device includes a second latitude and a second longitude information; and
wherein the data corresponding to the communication node includes an identifier of the communication node.

3. The method as recited in claim 1, further comprising:
determining that location data is received from a threshold number of electronic devices including the first and the second electronic devices; and
determining the location of the communication node based on the location data from the threshold number of electronic devices.

4. The method as recited in claim 1, further comprising:
receiving, from the first electronic device, a request for map data, the map data identifying a region within which data corresponding to one or more communication nodes is not needed; and
sending, to the first electronic device, the map data and an indication of a duration of time during which the map data is valid.

5. The method as recited in 1, further comprising:
generating map data identifying multiple geographical regions, the multiple geographical regions corresponding to locations for which data about one or more communication nodes that are located within the geographical regions is not needed;
detecting that the second electronic device is located within one of the multiple geographical regions; and
sending the map data to the second electronic device.

6. The method as recited in claim 5, further comprising:
sending to the second electronic device an indication to refrain from generating data corresponding to one or more communication nodes located within the area.

7. The method as recited in claim 5, further comprising:
sending to the second electronic device an indication to refrain from generating data corresponding to one or more communication nodes when the second electronic device is located within the area.

8. The method as recited in claim 1, further comprising:
determining that data corresponding to one more communication nodes located in the area has been received from a threshold number of devices including the first and the second electronic devices; and
sending a notification to a fourth electronic device located within the area to not send additional data corresponding to the one or more communication nodes.

9. The method as recited in claim 1, further comprising:
determining that the first data has expired;
receiving a request, from a fourth electronic device, to send fourth data including location data of the fourth electronic device and the data corresponding to the communication node; and
sending, to the fourth electronic device, a notification to send the fourth data.

10. The method as recited in claim 1, further comprising:
sending a request to the third electronic device to broadcast a suppression notification to a fourth device within communication range of the third electronic device.

11. The method as recited in claim 1, further comprising:
determining, prior to the sending to the third electronic device a notification to not send the third data, that a threshold amount of data corresponding to the communication node has been stored.

12. A system comprising:
a processor; and
a memory coupled to the processor and storing instructions executable by the processor to perform operations comprising:
receiving data from first electronic devices, the data including location data associated with the first electronic devices and communication node data corresponding to a communication node located in an area;
determining a location of the communication node, based at least in part on the location data and the communication node data;
receiving, from a second electronic device, a request to send additional data including second communication node data corresponding to the communication node;
determining that the additional data for the communication node is not needed; and
sending, to the second electronic device, a notification to not send the additional data.

13. The system as recited in claim 12, wherein determining that additional data for the communication node is not needed comprises determining that data has been received from a threshold number of electronic devices located in the area.

14. The system as recited in claim 12, wherein the determining that additional location data for the communication node is not needed comprises determining that the data received from the first electronic devices is geometrically diversified.

15. The system as recited in claim 12, wherein the location data received from the first electronic devices includes timestamps, and
wherein the determining that additional data for the communication node is not needed comprises determining that data has been received from a threshold number of electronic devices located in the area for a specified time interval.

16. The system as recited in claim 12, wherein to perform operations further comprises:
storing map data identifying multiple geographical regions corresponding to locations of one or more communication nodes, including one or more geographical regions for which location data about the communicate nodes are located within the geographical regions is not needed;
detecting that a third electronic device is located within one of the multiple geographical regions; and
sending to the third electronic device a notification to not send new location data.

17. The system as recited in claim 16, wherein to perform operations, further comprises sending to the third electronic device the map data.

18. The system as recited in claim 16, wherein to perform operations, further comprises sending to the third electronic device a request to broadcast the notification to not send new location data to other devices in proximity to the third electronic device.

19. The system as recited in claim 16, wherein to perform operations, further comprises:
determining that the location data for a geographical region has expired;
updating the map data for the geographic region of the expired location data; and
receiving, from a plurality of electronic devices, new location data corresponding to a communication node located in the geographic region of the expired location data.

* * * * *